United States Patent
Korba et al.

(10) Patent No.: US 7,912,589 B2
(45) Date of Patent: Mar. 22, 2011

(54) INITIALIZING AN ESTIMATION OF DYNAMIC MODEL PARAMETERS

(75) Inventors: Petr Korba, Turgi (CH); Marek Zima, Zürich (CH); Mats Larsson, Baden (CH)

(73) Assignee: ABB Research Ltd, Zurich (CH)

( * ) Notice: Subject to any disclaimer, the term of this patent is extended or adjusted under 35 U.S.C. 154(b) by 162 days.

(21) Appl. No.: 12/149,247

(22) Filed: Apr. 29, 2008

(65) Prior Publication Data

US 2008/0281437 A1 Nov. 13, 2008

Related U.S. Application Data

(63) Continuation of application No. PCT/CH2006/000608, filed on Oct. 31, 2006.

(30) Foreign Application Priority Data

Oct. 31, 2005 (EP) .................................. 05405614

(51) Int. Cl.
*G05D 5/00* (2006.01)
*G06F 7/60* (2006.01)
(52) U.S. Cl. ......................................... 700/286; 703/2
(58) Field of Classification Search .................. 700/286; 703/2
See application file for complete search history.

(56) References Cited

U.S. PATENT DOCUMENTS

| 4,741,023 A * | 4/1988 | Lawson ................. 379/106.01 |
| 6,104,182 A * | 8/2000 | Jurisch et al. ................. 324/142 |
| 6,476,512 B1 * | 11/2002 | Rutta ............................... 290/42 |
| 6,778,919 B1 | 8/2004 | Holbach et al. |
| 2002/0103629 A1 * | 8/2002 | Kutzner et al. ................... 703/7 |
| 2004/0102937 A1 * | 5/2004 | Ibrahim ............................ 703/2 |

FOREIGN PATENT DOCUMENTS

| EP | 1 261 096 A1 | 11/2002 |
| EP | 1 381 132 A1 | 1/2004 |
| EP | 1 489 714 A1 | 12/2004 |
| EP | 1489714 A1 * | 12/2004 |

* cited by examiner

*Primary Examiner* — Albert Decady
*Assistant Examiner* — Sivalingam Sivanesan
(74) *Attorney, Agent, or Firm* — Buchanan Ingersoll & Rooney PC

(57) ABSTRACT

The present disclosure relates to monitoring of electromechanical oscillations in electric power systems, and their identification by an adaptive algorithm based on a repeatedly measured and evaluated signal. In order for an estimation of parameters of a model of the power system to reasonably converge, proper initialization of the recursive calculation is required, including the definition of tuning parameters constraining the model and the calculation. Initialization for a second signal to be exploited can then be simplified by copying the set of tuning parameters tuned previously for a different signal. A conditioning gain multiplying the second signal establishes compatibility between the different signals, and a signal pre-filter in turn discards contributions beyond a frequency band comprising typical electromagnetic oscillations.

15 Claims, 2 Drawing Sheets

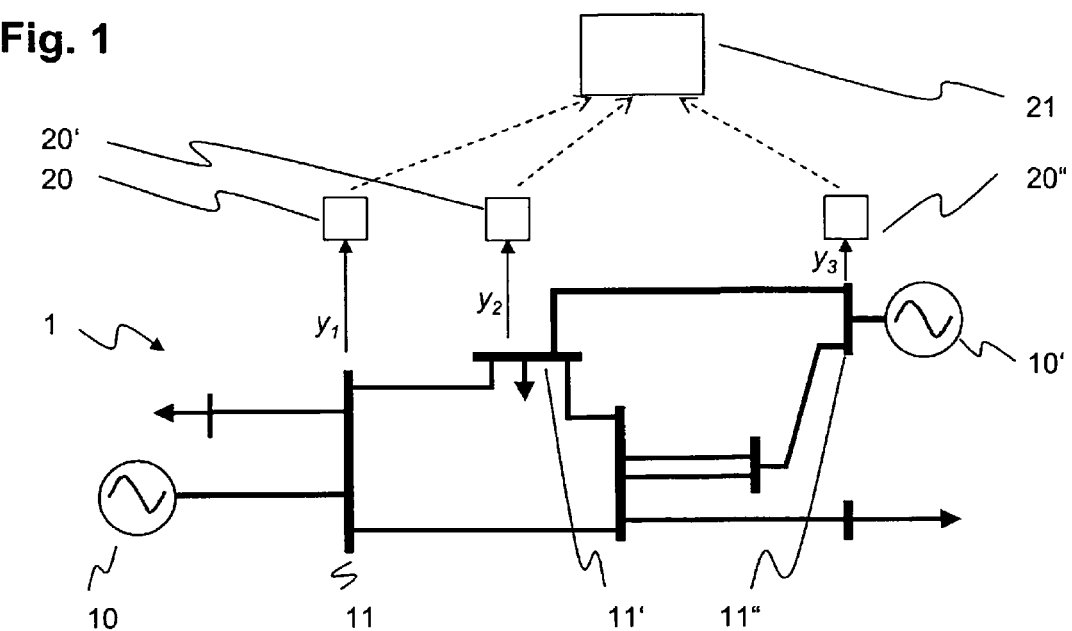
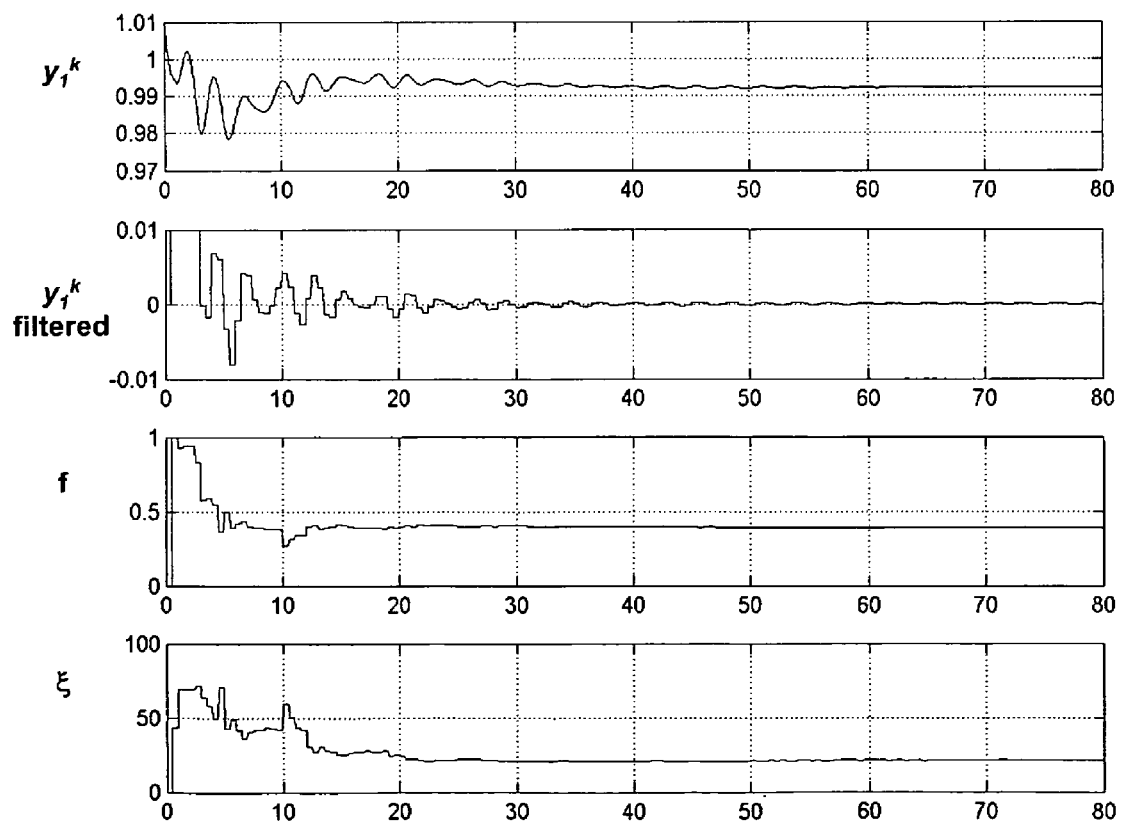
Fig. 3

Fig. 2
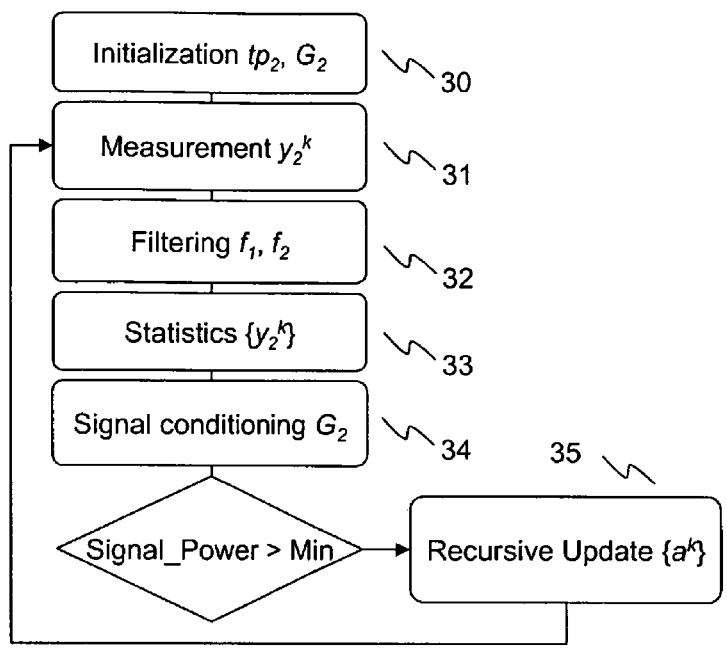
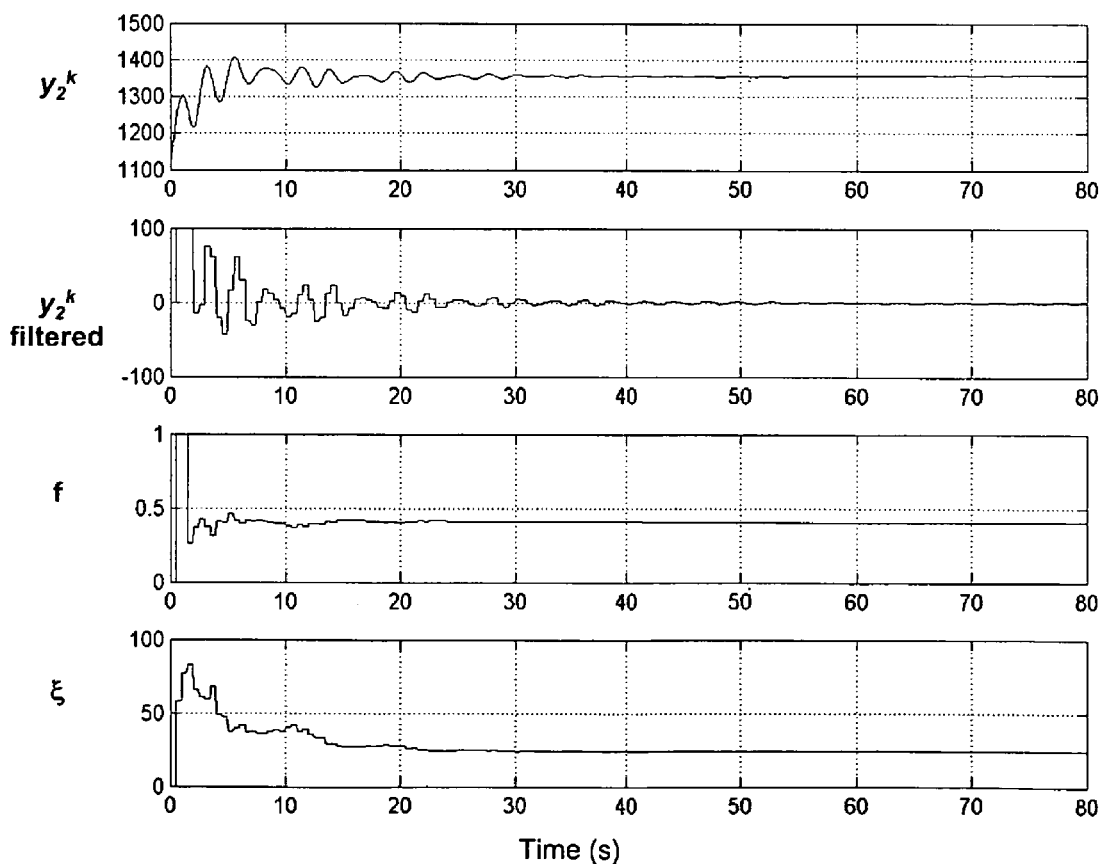
Fig. 4

INITIALIZING AN ESTIMATION OF DYNAMIC MODEL PARAMETERS

RELATED APPLICATIONS

This application claims priority under 35 U.S.C. §119 to EP Application 05405614.8 filed in Europe on Oct. 31, 2005, and as a continuation application under 35 U.S.C. §120 to PCT/CH2006/000608 filed as an International Application on Oct. 31, 2006 designating the U.S., the entire contents of which are hereby incorporated by reference in their entireties.

TECHNICAL FIELD

The disclosure relates to the field of monitoring electromagnetic oscillations in electric power systems comprising a plurality of generators and consumers. It departs from a method of initializing an estimation of model parameters of a parametric model of the power system.

BACKGROUND INFORMATION

In the wake of the ongoing deregulations of the electric power markets, load transmission and wheeling of power from distant generators to local consumers has become common practice. As a consequence of the competition between utilities and the emerging need to optimize assets, increased amounts of electric power are transmitted through the existing networks, invariably causing congestion, transmission bottlenecks and/or oscillations of parts of the power transmission systems. In this regard, electrical transmission networks are highly dynamic. In general, electromagnetic oscillations in electric power systems comprising several alternating current generators have a frequency of less than a few Hz and considered acceptable as long as they decay. They are initiated by the normal small changes in the system load, and they are a characteristic of any power system. However, insufficiently damped oscillations may occur when the operating point of the power system is changed, e.g. due to a new distribution of power flows following a connection or disconnection of generators, loads and/or transmission lines. Likewise, the interconnection of several existing power grids, even if the latter do not individually present any badly damped oscillations prior to their interconnection, may give rise to insufficiently damped oscillations. In these cases, an increase in the transmitted power of a few MW may make the difference between stable oscillations and unstable oscillations which have the potential to cause a system collapse or result in lost of synchronism, lost of interconnections and ultimately the inability to supply electric power to the customer. Appropriate monitoring of the power system can help a network operator to accurately assess power system states and avoid a total blackout by taking appropriate actions such as the connection of specially designed oscillation damping equipment.

In the Patent Application EP-A 1 489 714, an adaptive detection of electromechanical oscillations in electric power systems is based on a linear time-varying model. A system quantity or signal such as e.g. the amplitude or angle of the voltage or current at a selected node of the network is sampled, and the parameters of the linear model representing the behaviour of the power system are estimated by means of Kalman filtering techniques. This process is carried out in a recursive manner, i.e. every time a new value of the system quantity is measured the parameters of the model are updated. Finally, from the estimated parameters of the model, the parameters of the oscillatory modes, such as frequency and damping, are deduced and presented to an operator. This adaptive identification process enables a real-time analysis of the present state of the power system, comprising in particular the damping $\xi$ and frequency f of the dominant power oscillation mode, i.e. the mode with the lowest relative damping ratio.

In order for such an estimation of dynamic model parameters to work properly, the estimation has to be initialized by a set of properly chosen tuning parameters, such as the order of the dynamic model, the process and measurement noise, cut-off frequencies for signal pre-filters etc. In general, the values of the tuning parameters depend on the particular power system being monitored and on the particular signal being selected as the input for the monitoring algorithm. These values are then being adjusted or tuned by a commissioning engineer who analyzes the respective input signal and makes sure that the output of the subsequent estimation process, i.e. the estimated dominant frequency and damping, responds sufficiently fast and is not too sensitive with respects to measurement noise. In particular, the commissioning engineer has to adjust the values of the tuning parameters in such a way that an estimation error given by the difference between the measured signal and the signal predicted e.g. by the aforementioned linear time-varying model is minimal, and the captured oscillatory modes(s) of interest are estimated precise enough using a possibly small order of the dynamic model. It has turned out that this tuning procedure may be time intensive and requires a certain level of knowledge and experience of the commissioning engineer.

To identify oscillations in an electric power system, different system quantities such as amplitudes or phase angles of voltages, currents and power flows can be used as inputs to the proposed identification procedure. However, these signals differ with respect to their statistical properties such as magnitudes and signal variance. In order to simplify the tuning procedure, i.e. to find the best initial values of the tuning parameters to start the estimation algorithm, the abovementioned European Patent Application proposes to introduce a signal conditioning for all admissible measurements obtained from the power system being monitored.

SUMMARY

Exemplary embodiments disclosed herein can increase the flexibility in detecting and monitoring electromechanical power oscillations in an electric power system without increasing the engineering complexity or workload at commissioning. A method of initializing an estimation of model parameters of a parametric model of an electric power system and a system for monitoring an electric power system are disclosed.

A method of initializing a deduction is disclosed, from estimated model parameters $(a_1, a_2, \ldots)$ of a parametric model of an electric power system, of frequency and damping $(f, \xi)$ of an electromechanical oscillation mode of the power system (1), wherein the estimation of the model parameters $(a_j, a_2 \ldots)$ is based on a series of measured values $(y_2^1, y_2^2, \ldots)$ of a second system quantity $(y_2)$ of the power system and wherein said model parameters $(a_1, a_2, \ldots)$ are adaptively estimated every time a new value $(y_2^k)$ of the second system quantity $(y_2)$ is measured, wherein the method of initializing comprises tuning a set of tuning parameters $(tp_2)$ for the subsequent estimation of the model parameters $(a_1, a_2, \ldots)$, wherein the method comprises further tuning the set of tuning parameters $(tp_2)$ by copying tuning parameters $(tp_1)$ previously tuned for estimating the model parameters $(a_1, a_2, \ldots)$ based on a first system quantity $(y_1)$ of the electric power system, and determining a conditioning gain ($G_2$) for scaling the measured values ($y_2^1, y_2^2, \ldots$) of the second system quantity ($y_2$) prior to each adaptive estimation of the model parameters ($a_1, a_2, \ldots$).

A system for deducing, from estimated model parameters ($a_1, a_2, \ldots$) of a parametric model of an electric power system, frequency and damping (f, ξ) of an electromechanical oscillation mode of the power system, comprising two measuring units for measuring first and second system quantities ($y_1, y_2$), and a monitoring centre for estimating the model parameters ($a_1, a_2, \ldots$) based on a series of measured values ($y_2^1, y_2^2, \ldots$) of the second system quantity ($y_2$) of the power system, wherein said model parameters ($a_1, a_2, \ldots$) are adaptively estimated every time a new value ($y_2^k$) of the second system quantity ($y_2$) is measured, and wherein a set of tuning parameters ($tp_2$) are tuned for initializing the subsequent estimation of the model parameters ($a_1, a_2, \ldots$), wherein the system comprises means for tuning the set of tuning parameters ($tp_2$) by copying tuning parameters ($tp_1$) previously tuned for estimating the model parameters ($a_1, a_2, \ldots$) based on the first system quantity ($y_1$) of the electric power system, and means for determining a conditioning gain ($G_2$) for scaling the measured values ($y_2^1, y_2^2, \ldots$) of the second system quantity ($y_2$) prior to each adaptive estimation of the model parameters ($a_1, a_2, \ldots$).

A computer program is disclosed for controlling power flow and damping electromagnetic oscillations in a power system, which computer program is loadable into an internal memory of a digital computer to execute a method of initializing a deduction, from estimated model parameters (a1, a2, ...) of a parametric model of an electric power system, of frequency and damping (f, ξ) of an electromechanical oscillation mode of the power system, comprising the steps of tuning a set of tuning parameters (tp2) for the subsequent estimation of the model parameters (a1, a2, ...); tuning the set of tuning parameters (tp2) by copying tuning parameters (tp1) previously tuned for estimating the model parameters (a1, a2, ...) based on a first system quantity (y1) of the electric power system; and determining a conditioning gain (G2) for scaling the measured values (y21, y22, ...) of the second system quantity (y2) prior to each adaptive estimation of the model parameters (a1, a2, ...).

BRIEF DESCRIPTION OF THE DRAWINGS

The subject matter of the disclosure will be explained in more detail in the following text with reference to exemplary embodiments which are illustrated in the attached drawings, in which:

FIG. 1 schematically shows a power system,

FIG. 2 depicts a flow chart of a process of estimating model parameters,

FIG. 3 are results from an analysis of a power system based on a first system quantity $y_1$, FIG. 4 are results from an analysis of the same power system based on a second system quantity $y_2$ and initialized with the same tuning parameters.

The reference symbols used in the drawings, and their meanings, are listed in summary form in the list of reference symbols. In principle, identical parts are provided with the same reference symbols in the figures.

DETAILED DESCRIPTION

According to the disclosure, advantage is taken from the fact that for one and the same electric power system, a multitude of different system quantities, i.e. different signals measured at distinct locations, are available. In these distinct input signals however, the same dynamic phenomena, e.g. electromechanical oscillations, are observable. Hence, one may swap from one signal to another one, e.g. in order to track geographically or temporally a certain oscillation mode, such as an inter-area mode that may be observable in a measured voltage from a first location and in a current signal from another location of the power system, or that may shift following e.g. connection or disconnection of a transmission line or a generator.

In order to avoid independent tuning efforts for each of the system quantities when using e.g. a method of detecting electromechanical oscillations as mentioned initially, only the tuning parameters for a first or reference system quantity are determined independently. The initialization procedure for any second or further system quantity, that may e.g. offer a better observability of a certain oscillation mode, is then abbreviated by copying or re-using all or a fraction of the aforementioned tuning parameters and by determining an adequate re-scaling factor as a signal conditioning gain. The latter is determined by comparing the first and the second system quantity, it renders compatible different input signals and is a prerequisite for the successful re-use of the tuning parameter values stemming from the first system quantity. The copied set of tuning parameter values including said conditioning gain is then employed to identify model parameters representing the behaviour of the power system based on a series of measured values of the second system quantity.

The conditioning gain can be determined by comparing statistical information contained in the measured signals such as a maximum signal power, a mean value or a root mean square value, about a number of measured values of both the first and the second system quantity. An adaptation of the scaling factor can be arranged for in real-time.

In an exemplary embodiment, a band-pass filter is provided for the measured values of the second system quantity prior to the aforementioned signal conditioning. The filter may be based on a general knowledge about the oscillations that are tracked, or be defined based on, i.e. centred about, the frequency of the dominant electromechanical oscillation resulting from a previous analysis based on the first or reference system quantity.

A use of the above simplified tuning process of the parameter estimation concerns the derivation of information such as frequency or damping of the dominant oscillatory modes in the power system from the estimated dynamic model parameters. To this end, the dynamic model parameters can be determined by Kalman filtering techniques.

FIG. 1 shows an electric power system 1 including two generators 10, 10' and several substations represented each by a busbar 11, 11' 11" and interconnected by a number of transmission lines. System quantities $y_1, y_2, y_3$ such as the phase angle and/or the amplitude of voltages or currents, frequencies, power flows etc, are measured by suitable measuring units 20, 20', 20" located at various substations or nodes throughout the power system 1. The signals measured by the measuring units 20, 20', 20" are transmitted to and exploited in an oscillation monitoring centre 21. In general, several measuring units 20, 20', 20" may be implemented in one single device, which in addition does not need to be a dedicated device, the respective measuring functions being executable likewise by an intelligent electronic device provided for protection and control tasks in the system 1. Furthermore, the monitoring centre 21 could be identical with one of the measuring units 20.

As set out above, a proper initialization of the adaptive estimation of model parameters requires the tuning or off-line adjusting of the tuning parameters used for the recursive calculations. By way of example, in the procedure as set out in the aforementioned European Patent Application EP-A 1 489 714, the selection of the dynamical order n of a discrete-time autoregressive model, which order equals the number of parameters to be estimated, is the most important single aspect. If this order is too low, the obtained spectrum in the frequency domain will be highly smoothed, and the oscillations of interest with low-level peaks in the spectrum are dissimulated. On the other hand, if the order n is too high, faked low-level peaks will be introduced in the spectrum. In addition, the correlation matrix of the measurement noise $Q_m$ and process noise $Q_p$ represent further, less sensitive tuning parameters. Other tuning parameters are the sampling time $T_s$ between successive measured values of the system quantity y, and the cut-off frequencies $f_1$, $f_2$ for the signal pre-filter and a signal conditioning factor or gain G as detailed below.

FIG. 2 depicts an advantageous refinement of an adaptive real-time algorithm for the monitoring of power system oscillations as described in the aforementioned European Patent Application EP-A 1 489 714, the disclosure of which is incorporated herein for all purposes by way of reference. In initialization step 30, the tuning parameters $tP_2$ to be used with system quantity $y_2$ are determined according to the disclosure, i.e. copied from tuning parameters $tp_1$ determined previously for a different system quantity $y_1$. Step 30 includes an initial determination of the conditioning gain $G_2$, based e.g. on an off-line analysis of a limited number of measured values $\{y_1'\}$, $\{y_2'\}$ of the system quantities $y_1$, $y_2$ under consideration, and involving filtering and statistics steps as described in the following. During the repeated execution of the algorithm, new values $y_2(k)$ of the second system quantity $y_2$ are measured in measurement step 31 with a sampling or update frequency of $1/T_s$. The series of measured values of $y_2(k)$ is then band-pass filtered in filtering step 32, wherein the cut-off frequencies $f_1$, $f_2$ as tuning parameters have been introduced above, to yield a series of filtered values of $y_2(k)$. A statistical measure of this series of filtered values is determined in statistics step 33 for an eventual update of the conditioning gain $G_2$. Finally, the series of filtered values of $y_2(k)$ is re-scaled with the actual value of the conditioning gain $G_2$ in scaling step 34. If the latest measured, filtered and scaled value $y_2(k)$ exceeds a certain threshold, and/or if some counter indicates so, the series of filtered and scaled values of $y_2(k)$ is further exploited in a model parameter update step 35 as known in the art.

In more detail, the band-pass filtering step 32 prior to re-scaling removes the DC components below the lower cut-off frequency $f_1$ of e.g. 0.1 Hz and the higher frequencies above the upper cut-off frequency $f_2$ of e.g. 2 Hz. The fact that the typical frequencies of power system oscillations are known allows to define the band-pass range as indicated, however the cut-off frequencies $f_1$, $f_2$ can at any time be adapted if e.g. the results of the recursive algorithm indicates to do so.

Statistical measures of a band-pass filtered series s(k) of values measured during a period T that can be considered to initialize or update the conditioning gain $G_2$ comprise e.g. the maximum signal power, the mean-value or the root-mean-square value as follows.

$$S_r = \max_{0<k<T} s(k) \quad \text{(maximum value)}$$

$$S_r = \frac{1}{T}\sum_{k=1}^{T} |s(k)| \quad \text{(mean value)}$$

$$S_r = \sqrt{\frac{1}{T}\sum_{k=1}^{T} s(k)^2} \quad \text{(root mean square value)}$$

The conditioning gain $G_2$ can be calculated from the respective statistical measure $Sr_1$, $Sr_2$ of the first and second system quantity $y_1$, $y_2$ under consideration by division: $G_2=Sr_1/Sr_2$.

In case of low signal to noise ratio, e.g. in case of a fault of a measuring unit, the incoming signal, i.e. some subsequent measured values of the system quantity, may temporarily consist of noise with a mean value close to zero rather than of realistic data. It is then advantageous to consider all measurements to equal exactly zero, otherwise the dominant frequency of the noise is estimated rather than the dominant frequency of the measured signal. Based on an observation of the average signal power, a threshold is fixed, and the estimated model parameters will be frozen (not up-dated) if the actual signal power is lower than the threshold.

In the following, an example shows the effectiveness of the proposed procedure, in which two completely different signals have been chosen and analysed with the developed tool for detection of oscillations. Actually measured data comprise two series of 1600 values $y_1^k$, $y_2^k$ sampled at intervals of $T_s=0.05$ sec, corresponding to a short data collection interval of 80 sec.

First system quantity $y_1$: input signal is AC voltage with an RMS-amplitude of 400 kV±2 kV or 1 p.u.±0.005 in the conventional notation where 1 p.u.=400 kV. This is depicted in FIG. 3, first plot. On the second plot, the filtered signal is depicted. With a certain set of a total of 19 tuning parameters $tp_1$, the subsequent adaptive procedure results in the estimation of the dominant frequency f and its relative damping ξ as depicted in the third and forth plot of FIG. 3, converging to values of f≈0.45 Hz and ξ≈17% well within the interval shown. The initial spikes in the two bottom plots are caused by the transient behaviour of the model parameter estimation algorithm when no additional information is a priori included and all estimated model parameters ($a_1$, $a_2$, ... ) start from any initial value (here zero) and converge fast to their correct values.

Second system quantity $y_2$: input signal is power flow in a power line with values of 1350 MW±60 as depicted in FIG. 4, first plot. This kind of information is available to the commissioning engineer immediately after collecting a few samples and running a first analysis. According to the disclosure, the tuning parameters $tp_2$ for this second system quantity based on power flow measurements are copied from the first set based on voltage measurements. The conditioning gain $G_2$ to be used with the filtered second signal in this case can be calculated as $G_2=0.005/60=8.3$ e−5. As a result, the estimated oscillation parameters frequency and relative damping, using the second system quantity $y_2$, visibly converge at a similar speed (FIG. 4, third and forth plots) as the parameters from the recursive calculation based on the first system quantity $y_1$ (FIG. 3). The simplified initialization thus has substantially minimized the working time and tuning effort, without negatively affecting the quality of the results.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

List of Designations 1 electric power system
10 generator
11 busbar
20 measuring unit
21 oscillation monitoring centre

What is claimed is:

1. A method of initializing a deduction, from estimated model parameters ($a_1, a_2, \ldots$) of a parametric model of an electric power system, of frequency and damping (f, $\xi$) of an electromechanical oscillation mode of the power system, wherein the estimation of the model parameters (aj, $a_2 \ldots$) is based on a series of measured values ($y_2^1, y_2^2, \ldots$) of a second system quantity ($y_2$) of the power system and wherein said model parameters ($a_1, a_2, \ldots$) are adaptively estimated every time a new value ($y_2^k$) of the second system quantity ($y_2$) is measured, the method comprising:
    tuning, in a processor of a digital computer, a set of tuning parameters ($tp_2$) for the subsequent estimation of the model parameters ($a_1, a_2, \ldots$);
    tuning, in the processor, the set of tuning parameters ($tp_2$) by copying tuning parameters ($tp_1$) previously tuned for estimating the model parameters ($a_1, a_2, \ldots$) based on a first system quantity ($y_1$) of the electric power system; and
    determining, in the processor, a conditioning gain ($G_2$) for scaling the measured values ($y_2^1, y_2^2, \ldots$) of the second system quantity ($y_2$) prior to each adaptive estimation of the model parameters ($a_1, a_2, \ldots$).

2. The method according to claim 1, wherein the determination of the conditioning gain ($G_2$) comprises comparing a statistical measure ($S_{r1}, S_{r2}$) about the first and second system quantities ($y_1, y_2$).

3. The method according to claim 1, comprising providing a band-pass filter ($f_1, f_2$) for filtering the series of measured values ($y_2^1, y_2^2, \ldots$) of the second system quantity ($y_2$) of the power system prior to the scaling by means of the conditioning gain ($G_2$).

4. The method according to claim 3, comprising cutting off, by the bandpass filter ($f_1, f_2$), frequencies untypical of electromechanical power system oscillations.

5. The method according to claim 3, comprising providing a threshold for ignoring the latest filtered and scaled value ($y_2^k$) if it is below said threshold.

6. The method according to claim 4 comprising:
    deducing frequency and damping (f, $\xi$) of electromechanical oscillations in the electric power system from the model parameters ($a_1, a_2, \ldots$) estimated by Kalman filtering techniques.

7. The method according to claim 1 comprising:
    deducing frequency and damping (f, $\xi$) of electromechanical oscillations in the electric power system from the model parameters ($a_1, a_2, \ldots$) estimated by Kalman filtering techniques.

8. The method according to claim 7, comprising:
    adapting the conditioning gain ($G_2$) on-line.

9. The method according to claim 1, wherein at least one of the first and second system quantities includes a current, voltage or frequency quantity of the electric power system.

10. The method according to claim 1, wherein the parameters include at least one of process and measurement noise of the electric power system and electric filter cut-off frequencies.

11. The method according to claim 1, comprising:
    damping oscillations of the electric power system based on the tuning parameters and the conditioning gain.

12. A system for deducing, from estimated model parameters ($a_1, a_2, \ldots$) of a parametric model of an electric power system, frequency and damping (f, $\xi$) of an electromechanical oscillation mode of the power system, comprising two measuring units for measuring first and second system quantities ($y_1, y_2$), and a monitoring centre for estimating the model parameters ($a_1, a_2, \ldots$) based on a series of measured values ($y_2^1, y_2^2, \ldots$) of the second system quantity ($y_2$) of the power system, wherein said model parameters ($a_1, a_2, \ldots$) are adaptively estimated every time a new value ($y_2^k$) of the second system quantity ($y_2$) is measured, and wherein a set of tuning parameters ($tp_2$) are tuned for initializing the subsequent estimation of the model parameters ($a_1, a_2, \ldots$), the system comprising:
    means for tuning the set of tuning parameters ($tp_2$) by copying tuning parameters ($tp_1$) previously tuned for estimating the model parameters ($a_1, a_2, \ldots$) based on the first system quantity ($y_1$) of the electric power system; and
    means for determining a conditioning gain ($G_2$) for scaling the measured values ($y_2^1, y_2^2, \ldots$) of the second system quantity ($y_2$) prior to each adaptive estimation of the model parameters ($a_1, a_2, \ldots$).

13. A computer-readable recording medium containing a computer program for controlling power flow and damping electromagnetic oscillations in a power system, the computer program being loadable into an internal memory of a digital computer for causing the computer to execute a method of initializing a deduction, from estimated model parameters ($a_1, a_2, \ldots$) of a parametric model of an electric power system, of frequency and damping (f, $\xi$) of an electromechanical oscillation mode of the power system (1), wherein the estimation of the model parameters ($a_1, a_2, \ldots$) is based on a series of measured values ($y_2^1, y_2^2, \ldots$) of a second system quantity ($y_2^k$) of the power system and wherein said model parameters ($a_1, a_2, \ldots$) are adaptively estimated every time a new value ($y_2^k$) of the second system quantity ($y_2$) is measured, the method comprising:
    tuning a set of tuning parameters ($tp_2$) for the subsequent estimation of the model parameters ($a_1, a_2, \ldots$);
    tuning a set of tuning parameters ($tp_2$) by copying tuning parameters ($tp_1$) previously tuned for estimating for estimating the model parameters ($a_1, a_2, \ldots$) based on the first system quantity ($y_1$) of the electric power system; and
    determining a conditioning gain ($G_2$) for scaling the measured values ($y_2^1, y_2^2, \ldots$) of the second system quantity ($y_2$) prior to each adaptive estimation of the model parameters ($a_1, a_2, \ldots$).

14. A computer-readable recording medium containing a computer program for controlling power flow and damping electromagnetic oscillations in a power system, the computer program being loadable into an internal memory of a digital computer for causing the computer to execute a method of initializing a deduction, from estimated model parameters ($a_1, a_2, \ldots$) of a parametric model of an electric power system, of frequency and damping (f, $\xi$) of an electromechanical oscillation mode of the power system, the method comprising:

tuning a set of tuning parameters ($tp_2$) for the subsequent estimation of the model parameters ($a_1, a_2, \ldots$);

tuning the set of tuning parameters ($tp_2$) by copying tuning parameters ($tp_1$) previously tuned for estimating the model parameters ($a_1, a_2, \ldots$) based on a first system quantity ($y_1$) of the electric power system; and determining a conditioning gain ($G_2$) for scaling measured values ($y_2^1, y_2^2, \ldots$) of a second system quantity ($y_2$) prior to each adaptive estimation of the model parameters ($a_1, a_2, \ldots$), wherein at least one of the first and second system quantities includes a current, voltage or frequency quantity of the electric power system.

15. The computer-readable recording medium according to claim 14, wherein the estimation of the model parameters ($a_1, a_2, \ldots$) is based on a series of the measured values ($y_2^1, y_2^2, \ldots$) of the second system quantity ($y_2$) of the power system, wherein said model parameters ($a_1, a_2, \ldots$) are adaptively estimated every time a new value ($y_2^k$) of the second system quantity ($y_2$) is measured.

* * * * *